United States Patent Office 2,921,498
Patented Jan. 19, 1960

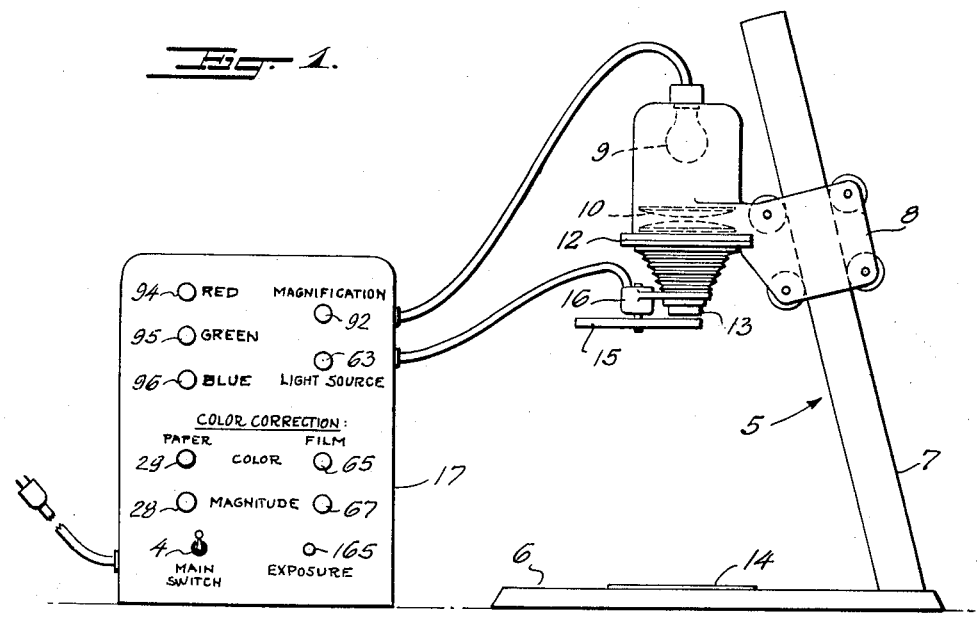
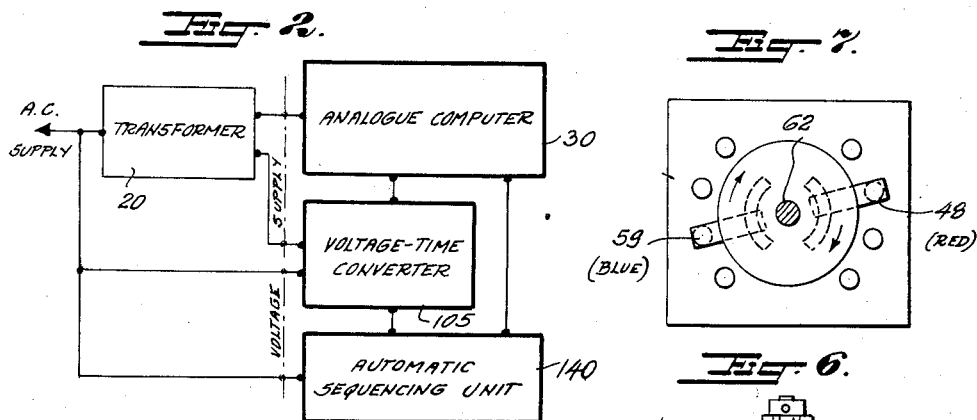
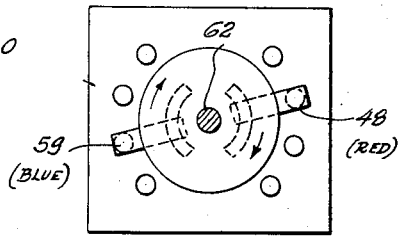
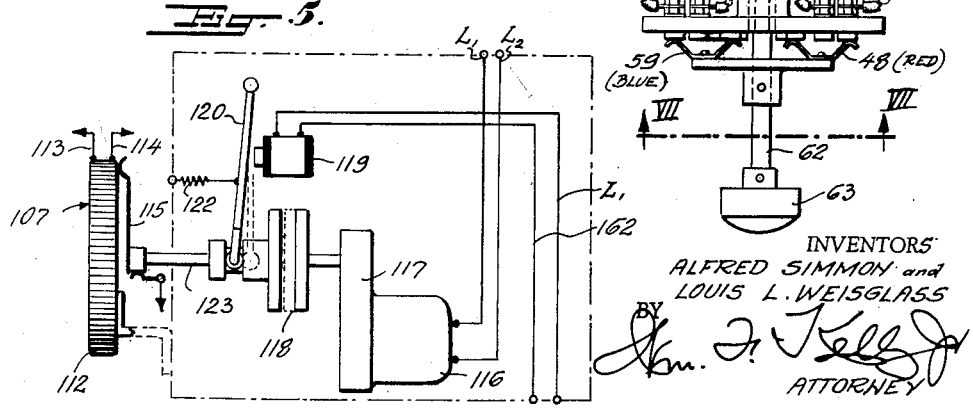

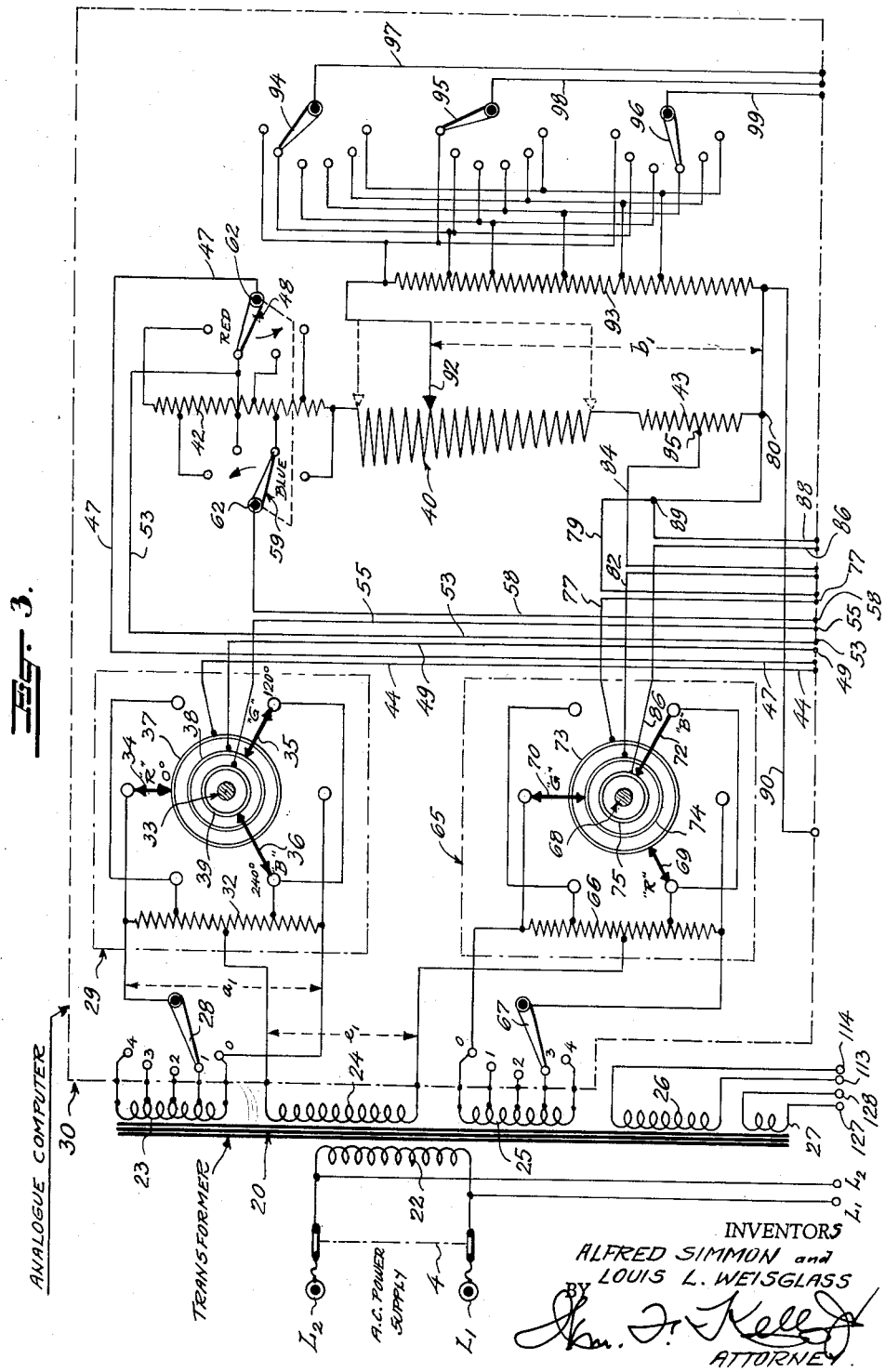

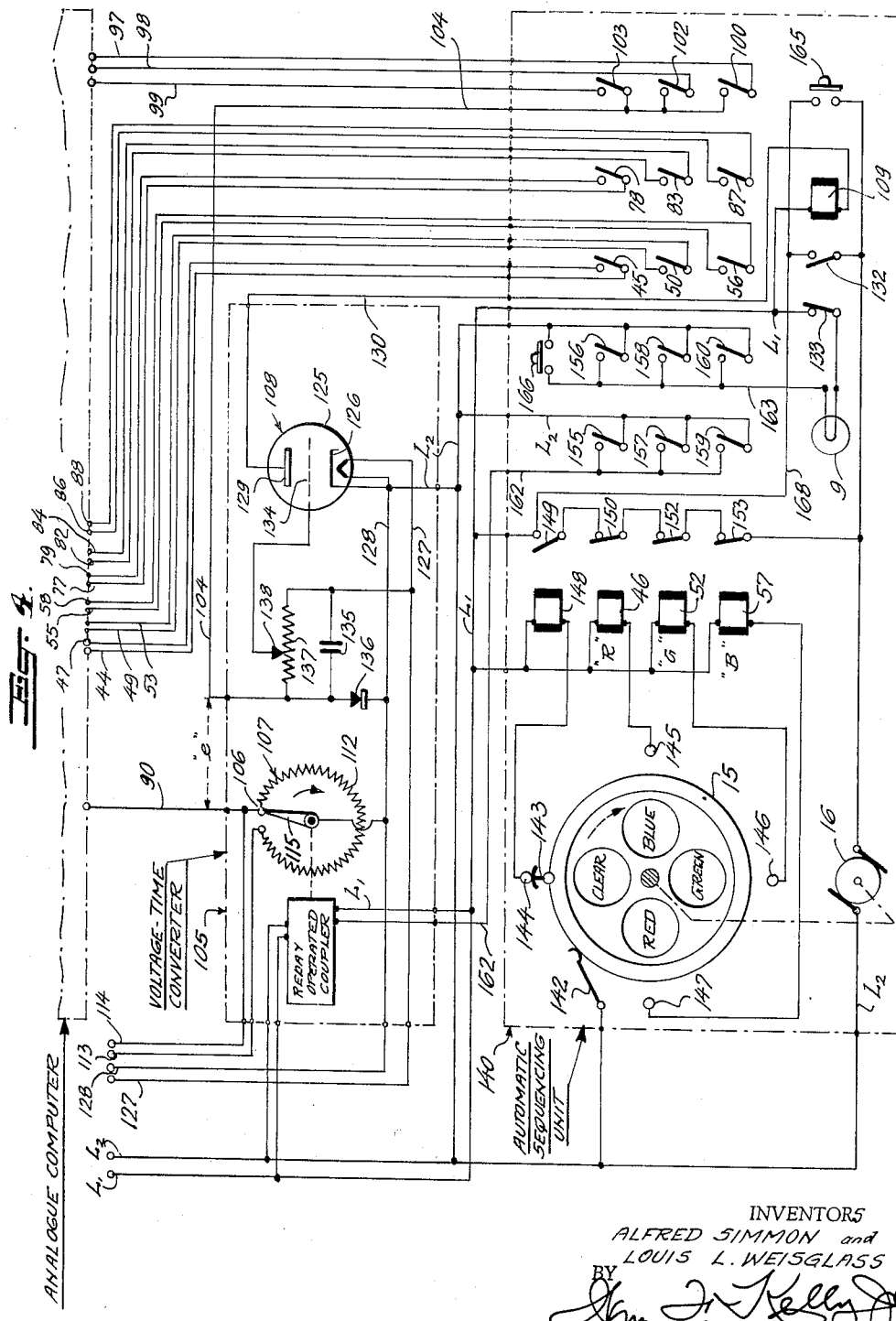

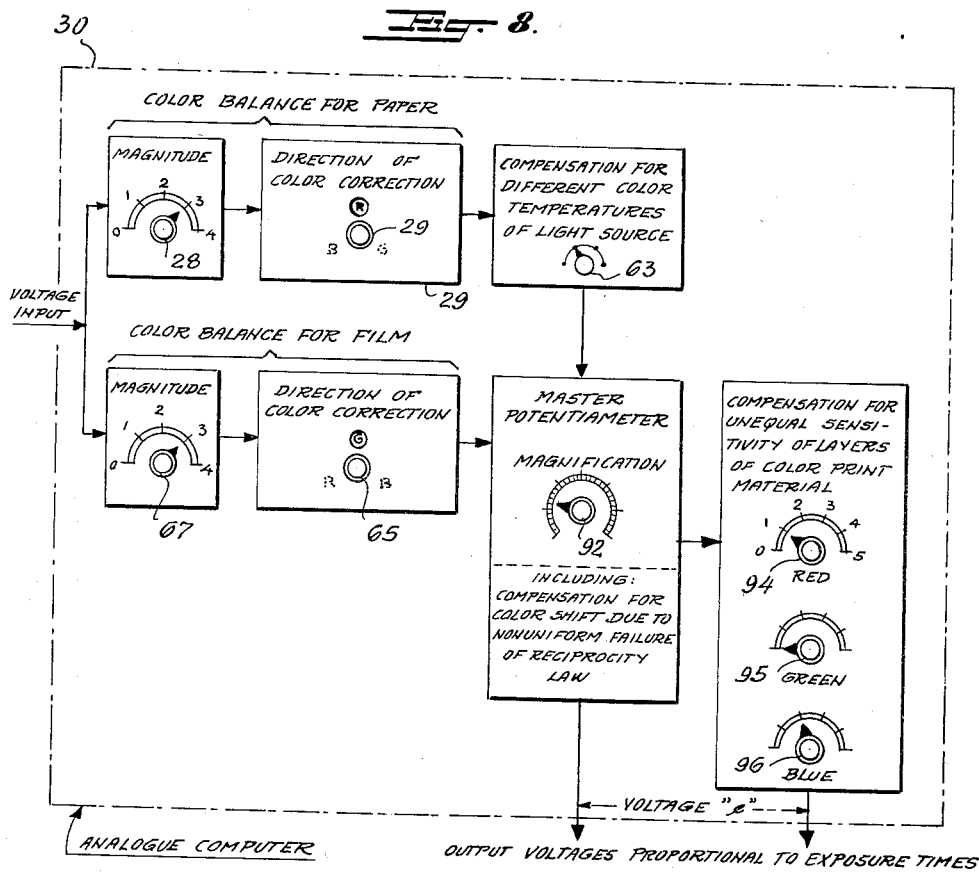
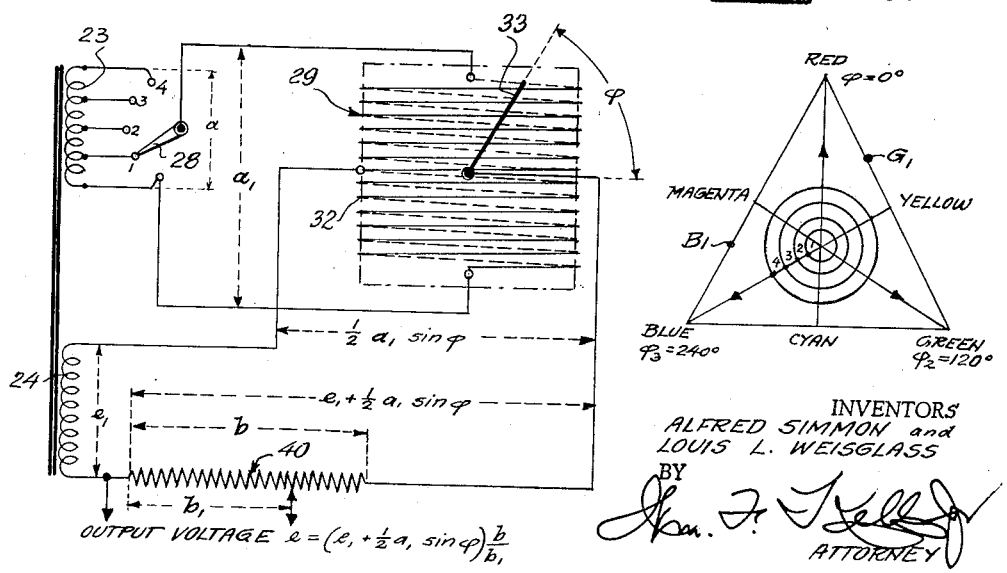

2,921,498

ELECTRICAL CONTROL DEVICE FOR USE WITH PHOTOGRAPHIC COLOR ENLARGERS AND PRINTERS

Alfred Simmon, Garden City, and Louis L. Weisglass, New York, N.Y., assignors to Simmon Brothers, Inc., Long Island City, N.Y., a corporation of New York Application September 12, 1957, Serial No. 683,526

18 Claims. (Cl. 88—24)

The present invention relates to color photography and more particularly to an electrical control device therefor which comprises a computing timer for controlling the period a sheet of multilayer color print material is consecutively exposed to light of three different colors for the purpose of making a colored print from a positive or negative transparency.

It has long been recognized in the art of color printing that the time during which the sensitized color print material must be subjected to each of the three colors of red, green, and blue, is not equal and hence such individual time-color periods must be adjusted during a given total exposure period in order to produce prints of a desired density and color character. This not only requires considerable skill but at best must be empirically determined which is an expensive and time consuming task. Hence it is equally well known in the art to provide mechanical and electro-mechanical control devices which are operable to select the total exposure time as well as the precise periods during which the color print material is consecutively exposed to light of three different colors. An electro-mechanical device for such purpose is shown and claimed in prior Simmon Patent No. 2,518,947 granted August 15, 1950, and assigned to the same assignee as the present invention.

As therein shown and described a computing device is provided which enables the operator to set the total exposure time and to adjust the direction of a necessary or desired color correction and its magnitude, while still keeping the total exposure time constant for the desired preselected density. This was arrived at by treating color correction as a vectorial magnitude having direction as well as size so that adjustment of the color correction for any one of the three colors does not affect the resultant density of the print. Although the device shown and described in such prior Patent No. 2,518,947 operates satisfactory for its intended purpose, it is nevertheless expensive to manufacture and because of its numerous mechanical parts, such as cams, cranks, and levers, etc., is subject to wear, which thus decreases the accuracy of the device with usage and materially effects the resulting color print, unless constant adjustments are made to compensate for such wear.

It is accordingly the primary object of the present invention to provide an electrically operable control device for color photography which is exceptionally accurate and dependable in its operation over a long useful life by elimination of mechanical parts subject to excessive wear and because of its simplicity is exceedingly economical to manufacture.

Another object of the present invention is the provision of an electrical control device for color print photography having a computing network or analogue computer for generating three voltages proportional to three exposure times each corresponding to one of the primary colors, a voltage-time converter for converting the three voltages into separate exposure times for each color, and an automatic sequencing unit for causing all operations to automatically occur in the proper sequence.

Still further objects of the present invention will become obvious to those skilled in the art by reference to the accompanying drawings wherein:

Figure 1 is an elevational view of a typical photographic enlarger provided with the electrical control device of the present invention, Fig. 2 is a block diagram of the essential elements of the electrical control device of the present invention showing their manner of connection to each other, Fig. 3 is a detailed diagrammatic illustration of the analogue computer portion of the electrical control device of the present invention, Fig. 4 is a detailed diagrammatic illustration of the voltage-time converter and automatic sequencing unit portions of the electrical control device of the present invention, Fig. 5 is a schematic illustration on an enlarged scale of the "Relay Operated Coupler" shown in block form in Fig. 4, Fig. 6 is a top plan view of a portion of the "Master Potentiometer" which forms a part of the analogue computer shown in Fig. 3, Fig. 7 is a sectional view taken on the line VII—VII of Fig. 6 looking in the direction indicated by the arrows.

Fig. 8 is a block diagram similar to Fig. 2 but showing the various portions of the analogue computer, Fig. 9 is a diagrammatic illustration of the circuit arrangement of the basic sine resolver for the color balance of either the paper or film and forming a part of the analogue computer, Fig. 10 is a diagrammatic illustration intended to depict color correction in both magnitude and direction.

Referring now to the drawings in detail, which illustrate an operative embodiment of the present invention, a photographic enlarger 5 of conventional design is shown in Fig. 1, which comprises a base 6 having a support 7 extending upwardly therefrom, the latter of which carries a slidably mounted projector carriage 8. Such projector carriage 8 is provided with the customary housed lamp 9, a condenser 10, a film stage 12 for supporting a color transparency, and a focusable lens 13. During the printing process the lens 13 projects a magnified image of the transparency carried by the film stage 12 on to a sheet of color print material 14 disposed on the base 6 in the usual manner.

Also disposed in front of the lens 13 is a filter unit assembly which, as shown, comprises a circular disc 15 having four apertures therein, which is automatically indexed by a solenoid or motor 16, to align one of these apertures carrying either a red, green, or blue filter, or the fourth clear aperture for focusing (Fig. 4), with the light beam projected by the lamp 9, condenser 10, and lens 13, on to the color print material 14. Both the lamp 9 and the motor 16 are connected, as shown in Fig. 1, to the control device housing 17 which also contains the necessary circuit elements as hereinafter more fully described. Although the specific location of such circuit elements is immaterial so far as the operation of the present invention is concerned, it has been found expedient from the manufacturing and sales standpoint to not only enclose them in the housing 17 but to conveniently divide them into separate sections as shown in Fig. 2, namely, an "analogue computer," "voltage-time converter," and "automatic sequencing unit," which receive energy from a "voltage supply" including a transformer and are electrically interrelated to each other in the manner shown by the connections of Fig. 2. The "analogue computer" is connected to the "transformer," as hereinafter more fully described, and is operable to generate or produce three voltages proportional to three exposure times corresponding to light of the three respective primary colors corrected for magnitude and direction, when the individual color filters are positioned in the light beam from the lamp 9. The "voltage-time converter" is provided, and so connected in the electrical network of the control device of the present invention, for the purpose of converting the three voltages produced by the "analogue computer" into exposure times, while the "automatic sequencing unit" is connected in the electrical network to assure automatic performance of all operations in the proper sequence.

Before proceeding with a detailed description of the present electrical control device it is desirable to consider certain basic relations which thus facilitates a more complete understanding of the electrical control device forming the subject matter of the present invention. It will accordingly be assumed, at least for the time being, that all three layers of the color print material 14 have equal sensitivity, and that under given conditions of color transparency, density (which may be either positive or negative), light intensity of the enlarger, and magnification ratio, a print of satisfactory density may be produced by three exposures of "$n$" seconds each to red, green and blue light respectively. Since only by a rare coincidence with such an assumption will this print have perfect colors, as one color usually is too pronounced and its complementary color is too weak, so that correction therefor must be made by changing the ratio of the three exposure times relative to each other, but without affecting their sum, if the satisfactory density of the print is to be maintained. As pointed out in the above-mentioned Simmon Patent No. 2,518,947, these three exposure times may be mathematically expressed as follows:

$$t_{red} = n(1 + mf(\phi))$$
$$t_{green} = n(1 + mf(\phi 120°))$$
$$t_{blue} = n(1 + mf(\phi 240°))$$

Where "$n$" is the original exposure time, "$m$" is a factor denoting the magnitude of the necessary color correction, and "$\phi$" an angle denoting the direction of such color correction. We may for example assign the values of $\phi = 0°$ to the red; $\phi = 120°$ to the green; and $\phi = 240°$ the the blue color, respectively. With such assigned values $\phi = 60°$ would then be a mixture of red and green, or yellow; $\phi = 180°$ would produce cyan; while $\phi = 300°$ would result in magenta. Thus, generally speaking, all conceivable mixtures of two primary colors in any desired proportions can accordingly be denoted numerically by an angle "$\phi$." It should also be borne in mind that mixtures of three primary colors need not be considered as equal proportions of all three such colors are meaningless since they simply add up to a neutral grey without effect upon the color balance of the print.

Since it is imperative to maintain the desired density of the print regardless of the color correction, the sum of $t_{red} + t_{green} + t_{blue}$ must not be altered, or $$mf(\phi) + mf(\phi + 120°) + mf(\phi + 240°) = 0$$

As pointed out in the aforementioned Patent No. 2,518,947 one of the functions that meets this condition is the sine function, since:

$$\sin \phi + \sin (\phi + 120°) + \sin ( -240°) = 0$$

and hence the corrected exposure times may henceforth be referred to mathematically as:

$$t_{red} = n(1 + m \sin \phi)$$
$$t_{green} = n(1 + m \sin (\phi - 120°))$$
$$t_{blue} = n(1 + m \sin (\phi - 240°))$$

By reference now more particularly to Figs. 3 and 4 the detailed circuitry of the electrical control device of the present invention is therein shown which comprises a transformer 20 (Fig. 3) having its primary winding 22 connected to an "A.C. Power Supply" L1—L2 and provided with a plurality of secondary windings 23, 24, 25, 26, and a low voltage secondary 27. Although the secondary windings 23 and 25 might be readily made stepless like the secondaries 24 and 26, it has been found highly advantageous to utilize a step-switch 28 which, together with the various contacts engaged thereby, thus makes the secondary winding 23 a variable transformer capable of producing a plurality of output voltages that can be readily duplicated and corresponding to the magnitude of color shift or correction. Moreover, the utilization of the variable transformer 23 eliminates the problem of excessive wattage and leakage danger, due to poor insulation, as well as excessive impedance which would be present with a plurality of potentiometers.

For a better understanding of the manner in which various voltages are produced in accordance with the present invention and corresponding to the above-noted mathematical formula reference is now made more specifically to Fig. 9 which shows a basic sine resolver. As shown in this latter figure, the variable transformer 23 produces a total voltage "$a$" while the output voltage "$a_1$," as determined by the adjustment of the magnitude control arm comprising the step-switch 28, is fed into a "sine resolver" 29 forming part of the "analogue computer" 30, and the primary purpose of which is to modify the output voltage "$a_1$" so as to produce voltages corresponding to direction of color shift or correction. Such sine resolver as shown in Fig. 9 comprises a tapped resistor 32 and a rotatable arm 33 in which this resistor is shown as made of a thin piece of insulating material, sometimes called a "card," of substantially square shape upon which numerous convolutions of relatively thin resistance wire is wound or the "card" may be coated with a thin layer of carbon or some other suitable material. The sine resolver 29 is also connected to the output voltage "$e_1$" of the transformer secondary winding 24 and the output voltage of such sine resolver is supplied to what will hereinafter be referred to as a master potentiometer 40.

It will be noted from Fig. 9 that the axis of the rotatable arm 33 is mounted about the center of the resistor 32 and forms an angle $\phi$ relative to the resistor output corresponding to the direction of color correction as hereinbefore referred to. Also the sine resolver output voltage attributable to the variable transformer 23 input setting thus equals one-half the latter multiplied by the sine of angle $\phi$ or ½ $a_1$ sin $\phi$, while its total output with the addition of the input voltage "$e_1$" from the transformer secondary winding 24 then equals $e_1 + \frac{1}{2} a_1$ sin $\phi$ and which constitutes the input voltage "$b$" to the potentiometer 40 and whose output voltage "$b_1$" is determined by the setting of the potentiometer arm. From this it should be apparent that the output volage of the sine resolver 29 or:

$$e_1 + \frac{1}{2} a_1 \sin \phi$$

controls the total exposure time. The final total output voltage "$e$" of the basic circuit of Fig. 9 may accordingly be expressed as:

$$e = \left( e_1 + \frac{1}{2} a_1 \sin \phi \right) \frac{b}{b_1}$$

or $$e = e_1 \frac{b}{b_1} \left( 1 + \frac{1 a_1}{2 e_1} \sin \phi \right)$$

and if we make $$e_1 \frac{b}{b_1} = n \text{ and } \frac{1 a_1}{2 e_1} = m$$

we have a circuit which produces a voltage proportional to the corrected exposure time for one of the primary colors because we have then:

$$e = n(1 + m \sin \phi)$$

which corresponds to the voltage produced for the color correction of one of the primary colors.

By reference again more particularly to Figs. 3 and 4 this basic circuit arrangement for producing a voltage proportional to the corrected exposure time has been extended to all three of the primary colors in accordance with the practical embodiment of the present invention by providing the rotatable arm 33 in the form of a step-switch with three contact arms 34, 35 and 36 disposed 120° apart and insulated from each other but each arm individually electrically connected to a slip-ring 37, 38 and 39 respectively, as shown in Fig. 3. The resistance between the taps of the resistor 32 are so chosen that they are proportional to the differences sin $\varphi_1$−sin $\varphi_2$ where $\varphi_1$ and $\varphi_2$ are the angles (similar to the angle $\varphi$ in Fig. 9) occupied by adjacent contacts of the step-switch 33 to which these taps are connected. It will also be noted that in the position of the contact arms of the step-switch 33, as shown in Fig. 3, the contact arm 34 which is designated "R" (red) is at the resistor tap having value $\varphi=0°$, while contact arm 35 indicated "G" (green) is at the resistor tap having the value $\varphi=120°$ and contact arm 36 is at the resistor tap shown as "B" (blue) having the value $\varphi=240°$ which are the values shown in the above-noted formula. Also while no additional taps have been shown for the sake of clarity it should be noted that intervening resistor taps, which differ from those shown as above-mentioned by an angle of 60° would be those previously referred to which produce a voltage corresponding to yellow ($\varphi=60°$), cyan ($\varphi=180°$) and magenta ($\varphi=300°$). Thus the sine resolver 29 with its step-switch 33 having the arms thereof offset 120° relative to each other generates, one after the other, three separate voltages which are respectively proportional to three corrected exposure times for the three primary colors in both magnitude and direction. It is also to be understood that although only a relatively few taps have been shown on the resistor 32 many more may be employed if desired to further increase the fineness of adjustment.

This color correction may be better appreciated by reference to Fig. 10 wherein a diagram has been shown in the form of a triangle with the respective angles thereof designated "red," "green" and "blue" so that at the point of intersection of the bisectors of these angles it corresponds to a neutral gray color. Enclosed within such triangle with their axes at the point of intersection of the bisectors are a plurality of concentric circles of increasing diameter and numbered 1 to 4, and which correspond to the various voltages produced by the adjustment of the variable transformer step-switch 28 to the same numbered taps as shown in Figs. 3 and 9, to select the magnitude of the color correction which is depicted as increasing with increasing diameter of the circles of Fig. 10. Also extending radially from the axis of the concentric circles of Fig. 10 are the bisectors which, looking in the direction indicated by the arrows, extend toward the "red," "green" and "blue" and being disposed at an angle of 120° relative to each other thus correspond to the three arms of the sine resolver 29 which select a voltage proportional to the direction of desired color correction. Taking the assigned value as before mentioned of $\varphi=0°$ for the "red" then the direction line for the "green" is shown in Fig. 10 as terminating at the value $\varphi_2=120°$ and the direction line for the "blue" terminates at the value $\varphi_3=240°$.

To further illustrate the significance of Fig. 10, if we assume that the input voltage to the sine resolver 29 is 100 volts and the arms are set in the position shown in Fig. 3 then the voltage value distribution would be 50 volts for the "red," minus 25 volts for the "green" and minus 25 volts for the "blue." Also let it be assumed that as a result of a test print the magnitude indicates the color to be at the point indicated by the cross on circle #3 in Fig. 10 which is too high. The operator then moves the step-switch 28 into engagement with tap #1, which is the position shown in Figs. 3 and 9, and corresponding to circle #1 in Fig. 10 which thus decreases the magnitude for all three primary colors. As to the direction of the color correction the operator then rotates the sine resolver step-switch 33 either clockwise or counterclockwise depending upon the color correction desired. Again reverting to the above noted assumed voltage values, if the sine resolver 29 is set so that the "G" arm 35 engages the top contact in place of the "R" arm 34 shown in Fig. 3 then the voltages would change to 50 volts for the "green," −25 volts for the "blue" and −25 volts for the "red," thus making the direction of the color correction toward the green to a point G1 on one side of the triangle of Fig. 10. Likewise a rotation of the step-switch 33, to position the arm 36 in engagement with the top contact in place of the "R" arm 34 shown in Fig. 3, results in a shift or correction of the color toward the blue to a point B1 on another side of the triangle of Fig. 10 with a division of the voltages to 50 volts for the "blue" and minus 25 volts for each the "red" and "green." It is to be understood of course that these voltage values and the points on the sides of the triangle of Fig. 10 have been assumed solely for purposes of illustration and hence are not to be taken as accurate as to values or magnitude.

Returning now again to Figs. 3 and 4 the output voltage from the sine resolver 29 and corresponding to the color correction of both magnitude and direction for each of the primary colors, and as selected by the individual arms 34, 35 and 36 of the step-switch 33, is separately supplied to the master potentiometer 40 depending upon which of three relays is energized. It will be noted from Fig. 3 that the slip-ring 37, with which the "R" (red) contact arm 34 is engaged, is connected by a conductor 44 to a normally open relay contact switch 45 (Fig. 4) of a relay 46 ("red") and a conductor 47 extends from such contact switch 45 to a step-switch 48 engageable with taps of the resistor end 42 of the master potentiometer 40. Similarly the slip-ring 38, with which the "green" contact arm 35 of a step-switch 33 is engaged, is connected by a conductor 49 to a normally open relay contact switch 50 (Fig. 4) of a relay 52 ("green") and a conductor 53 extends from this contact switch 50 to a tap approximately at the center of the resistor end 42 of the master potentiometer 40. The final slip-ring 39, with which the "blue" contact arm 36 of step-switch 33 is engaged, is connected by a conductor 55 to a normally open relay contact switch 56 (Fig. 4) of a relay 57 ("blue") and a conductor 58 extends from this contact switch 56 to another step-switch 59 also engageable with taps of the resistor end 42 of the master potentiometer 40.

It is also highly desirable to provide compensation for different color temperature of the light source. This is because of the fact that color balance of transparencies is profoundly affected by the color temperature of the light source with which they are taken. In the case of positive transparencies which are primarily intended for projection, this is generally taken into account by either using a film with an emulsion that is properly balanced for a specific light source, or by the use of a suitable correcting filter. When negative transparencies are used, the appearance of the transparency itself is no longer important and it becomes feasible to take pictures without filters with different light sources on the same film, and to restore the correct color balance later when the print is made.

Since most light sources are inherently incandescent black bodies, and differ only by their temperatures, we have found that using the green light transmitted by a transparency as a standard of comparison, negatives taken with a light source of lower color temperature, for example, transmit relatively less red and relatively more blue. In a negative-positive printing process, this results in a print with an excess of red and a lack of blue which must be corrected by increasing the red and decreasing the blue exposure time, since in a negative-positive process increasing the red exposure time results in a print that is less red. For this reason it is desirable to make provisions for still further adjustments beyond the production of the voltages proportional to exposure times by the sine resolver 29 as above mentioned.

It is for this reason that the master potentiometer 40 has been provided with the tapped resistor end 42 and the step-switches 48 and 59 associated therewith. By reference to Fig. 3, and more particularly to Figs. 6 and 7, it will be noted that these latter step-switches are mounted on a common shaft 62 and since the step-switch 48 is associated with the "red" exposure and step-switch 59 with the "blue" exposure, while the "green" is unaffected since the inlet voltage (from sine resolver 29) is fixedly connected to approximately the center tap of resistor end 42, the circuit voltage can be still further adjusted for a negative that was taken with a light source of a lower temperature, by moving the control knob 63 (Fig. 6) on shaft 62 in a clockwise direction. Such clockwise rotation moves the "red" step-switch 48 down and the "blue" step-switch 59 up, as shown by the arrows in Figs. 3 and 7, and since the taps of the resistor end 42 are inlet taps, such downward movement of step-switch 48 with simultaneous upward movement of step-switch 59, increases the voltage corresponding to the "red" exposure time and decreases the voltage corresponding to the "blue" exposure time, while leaving the voltage representing the "green" unaffected by such adjustment.

Although the sine resolver 29 has been provided for the purpose of producing output voltages which are proportional to three corrected exposure times in both magnitude and direction for the three primary colors, and the step-switches 48 and 59 are operable to still further modify the circuit voltage to compensate for different color temperature of the light source, it is also desirable to provide separate adjustments of color balance for paper as well as film. Color corrections are needed for two primary reasons, the color balance (or perhaps more properly termed "unbalance") of the color print material or paper, and the color balance of the film. Since, as mentioned in prior Patent No. 2,518,947, both have the characteristic of a vector, the combination of both represents the sum of two vectors and because of this relationship we can very readily provide separate color balance for paper and film respectively.

Accordingly a second sine resolver 65 is provided which has its tapped resistor 66 connected by a step-switch 67 to various taps of the winding of auto-transformer 25 which again is operable to produce voltages corresponding to color correction of both magnitude and direction for each of the primary colors. This sine resolver 65 also has a rotatable step-switch 68 having three contact arms 69, 70 and 72 disposed 120° apart electrically connected to slip-rings 73, 74 and 75, respectively, and in all other respects identical structurally with that of sine resolver 29 as hereinbefore described. Since one end of the secondary winding 24 is centrally connected to the tapped resistor 66, its voltage together with the sum of the output voltages from the sine resolvers 29 and 65, as modified by the tapped resistor end 42, is impressed upon the master potentiometer 40. Since the circuit up to the master potentiometer with its tapped resistor end 42 is perfectly symmerical one set of controls, for example, the step-switch 28 and step-switch 33, may be used to correct in both magnitude and direction for the color balance of the paper and once set for a given batch of paper (by printing a transparency of known characteristics) need not be further disturbed so long as the supply of that particular batch of paper lasts, while the set on the other side of the circuit, namely, the step-switches 67 and 68 may be adjusted to compensate, in both magnitude and direction, for any "color unbalance" of the films that are to be printed.

In order to transmit the voltages from the sine resolver 65 to the master potentiometer 40, the slip-ring 73, which is engaged by the "red" contact arm 69, is connected by a conductor 77 to another normally open relay contact switch 78 (Fig. 4) of the "red" relay 46, and a conductor 79 extends from such contact switch 78 to the extreme end 80 of the fixed resistor end 43 of master potentiometer 40. Likewise the slip-ring 74 engaged by the "green" contact arm 70 is connected by a conductor 82 to a normally open "green" relay contact switch 83 (Fig. 4) of the "green" relay 52 and a conductor 84 extends from the latter to a tap 85 on the fixed resistor end 43 of the master potentiometer 40. Similarly the slip-ring 75 engaged by the "blue" contact arm 72 is connected by a conductor 86 to a normally open "blue" relay contact switch 87 of the "blue" relay 57, and a conductor 88 extends from the other contact of switch 87 to a junction 89 with conductor 79, which thus also connects conductor 88 to the extreme end 80 of the fixed resistor end 43 of master potentiometer 40.

The master potentiometer 40, as shown in Fig. 3, is specially constructed so that its calibration is in units proportional to magnification ratios. Since exposure time is a function of the square of the magnification ratio, the dial would necessarily have unevenly spaced divisions which at the beginning would be inconveniently crowded and at the end unnecessarily widely separated. In order to accordingly space the magnification ratios evenly on the dial of the potentiometer 40, the resistance element thereof is so formed that its resistance per unit length increases linearly with the distance from the zero point thus resulting in the total resistance, reckoned from the zero point, increasing with the square of the distance from such point. An element having this desired resistance, and as schematically shown in Fig. 3, can be formed by winding the resistance wire on a "card" or the like of triangular shape with the height of the triangle, and therefore both the length of the wire and the resistance per unit length, increasing linearly with the distance from the apex of the triangle. However, since it is physically impossible to wind the wire immediately adjacent the apex of the triangular "card," and the region thereof corresponds to such impossibly short exposure times, the "card" is actually made of trapezoidal shape and the fixed resistance end 43 added to complete the master potentiometer. Also this master potentiometer may be formed by substituting a thin coating of carbon or similar material, for the resistance wire on the "card," if desired.

In addition to the necessity for compensating for the various above noted variables, there is another which is equally important and this is the failure of the reciprocity law which can be observed in some measure in all light sensitive silver emulsions. It means that the density produced by a given exposure varies as a function of exposure time, even if the product of light intensity times exposure time is kept constant. Although this is only of minor significance so far as black and white photography is concerned it is more serious for color processes because the three layers of multi-layer printing material usually exhibit this property in different degrees and at different times. The consequence is that a large print of a certain transparency or negative, made with a relatively high degree of magnification and consequently of a relatively long exposure time, will not have the same color as a previously made small testprint made from the same transparency with a smaller magnification and a shorter exposure time, in spite of the fact that both were made with the same color balance or ratio of the three exposure times relative to each other.

To illustrate by a specific example small prints made on a certain commercially available color paper show a magenta tinge if made with a color balance that produces satisfactory large prints on the same paper. Inasmuch as this happens to be a negative-positive process the remedy is to make the red and blue exposures relatively longer for short exposures, or what may be more convenient, shorten the green exposure under the same circumstances.

This compensation for color shift due to nonuniform failure of the reciprocity law is readily made by the electrical control device of the present invention and is accomplished by supplying the voltage from the sine resolver 65 for the red and blue exposure times, depending upon which of the relays 46 or 57 is energized to cause closure of its respective contact switch 78 or 87, to the end 80 of the fixed resistance 43 which forms part of the master potentiometer 40 and supplying the voltage corresponding to the green exposure upon energization of relay 52 with closure of its contact switch 83, to the tap 85 on such fixed resistance end 43. It should accordingly be obvious that the resistance between the tap 85 and the adjustable contact 92 of the master potentiometer 40 is less than the resistance between such adjustable contact 92 and the extreme end 80 of the resistance 40—43 with the voltages between such points of course being affected accordingly. In other words the output voltage of this circuit which is proportional to the green exposure time is shorter than it would be in the absence of the tap 85, while the voltages representing the red and blue exposure times are, of course, unaffected. Moreover, the relative value of this difference varies as a function of exposure time automatically in precisely the right manner which can best be appreciated by a numerical example.

Let it be assumed that the resistance of the main winding of master potentiometer is 9000 ohms, the resistance of fixed resistor end 43, exclusive of the portion between points 80 and 85, is 900 ohms and that the latter excluded part between the points 80 and 85 is 100 ohms. In the highest position of adjustable contact 92, i.e. when output voltages represent long exposure times, the voltages proportional to red and blue exposure times are built up across a total resistance of 10,000 ohms (9000+900 +100) and the voltage corresponding to the green exposure time is built up across only 9900 ohms (9000 +900), a difference of only 1% which is negligible. However, in the lowest position of the adjustable contact 92, when output voltages represent short exposure times, the corresponding figures for red and blue are 1000 ohms (900+100), and for green 900 ohms, a difference of 10% which is quite drastic. The effect at intermediate settings of the adjustable contact 92 will of course vary between these two percentage extremes, or even the percentage spread can be modified by changing the location of the tap 85 if desired. By the incorporation of this particular compensating feature in the present invention it is thus possible to determine the proper color balance from a small test print before a large print is made which thus results in a considerable savings of time and money.

The present invention as thus far described has been based on the assumption, as previously mentioned, that the three layers of the color print material have equal sensitivity. Actually, however, this is rarely, if ever, the case and usually very significant differences are found with one layer perhaps four to five times more sensitive than another. Consequently the respective exposure times for the three colors must be multiplied by certain factors, and while the absolute magnitude of these factors is a matter of choice, their ratios relative to each other must be in inverse proportion to the respective sensitivities of the three layers. The same is, of course, true of the voltages which are proportional to exposure times and which are produced by the system as thus far described and which constitute the output voltage $b_1$ of the master potentiometer 40 at any particular setting of its adjustable contact 92. Such factors are most readily applied to a voltage by means of a potentiometer of the resistance type and from this it naturally follows that no factor can be larger than unity. It would also seem only logical to make the factor applied to the lease sensitive (slowest) layer not smaller than unity but this would merely reduce all three voltages unnecessarily and in the same proportion. Therefore it follows that the most feasible solution is to leave the voltage representing the exposure time of the color to which the slowest layer is sensitive unchanged and shorten the two others by connecting their respective voltages representing the exposure time of the two more sensitive layers to separate potentiometers.

The difficulty with this solution, however, resides in the fact that the particular one of the three layers which is the least sensitive varies from time to time not only between papers of different manufacture but also between batches of paper of the same manufacture. It is accordingly desirable to provide three potentiometers, or a combination of a single resistance element and three adjustable contacts may be used with the advantage of decreasing expense and reducing the current that the master potentiometer would otherwise have to carry. Accordingly provision is also made in the electrical control device of the present invention to compensate for unequal sensitivity of the layers of the color print paper by impressing the output potential $b_1$ from the master potentiometer 40 across a tapped resistor 93 having three step-switches 94, 95 and 96 with corresponding contact steps of all three of these step-switches being connected in electrical parallel but connected to the resistor 93 so that the resistance between contact steps is nonuniformly distributed in such a way that the voltage changes between adjacent steps always amounts to the same percentage (i.e., logarithmic attenuation). In the setting of the step-switches it is essential to first determine which of the three layers of the paper is the least sensitive and once this is done, the step-switch 94, 95 or 96 which controls the voltage proportional to the exposure time for that particular color must always be set at its highest position while each of the remaining step-switches will be at a lower setting.

The voltages selected by these three step-switches 94, 95 and 96 are connected by conductors 97, 98 and 99, respectively, to normally open relay contact switches 100, 102 and 103 (Fig. 4) of the "blue" relay 57, "green" relay 52, and "red" relay 46, respectively, and upon energization of any one of these relays with closure of its respective contact switch, one side of the output voltage from either the step-switch 94, 95 or 96 will be supplied by a common conductor 104 extending from each of the contact switches 100, 102 and 103 to one side of the input of the "voltage-time converter" 105 shown in Fig. 4, while the other input side, and across which is impressed the total output voltage "e," is connected by a conductor 90 to the end of tapped resistor 93 (Fig. 3).

The circuit arrangement of the electrical control device of the present invention as thus far described, and comprising the "analogue computer" 30 shown in Fig. 8, produces voltages which, in accordance with the settings of the various controls, are proportional to exposure times. However, in order to cause operation of the device to make a print, such voltages must be converted into actual exposure times which is done by the "voltage-time converter" 105 and shown more in detail in Fig. 4. Such converter comprises three principal parts, a linear voltage generator 107, a sensing element 108 and a relay 109. This linear voltage generator 107 produces a voltage which, during the time of exposure, and starting from zero at the beginning of the exposure, increases in linear relation with the elapsed time. In the form shown herein such generator 107 comprises a potentiometer 112 upon which a constant voltage is impressed by being connected by conductors 113 and 114 across the secondary winding 26 of transformer 20 (Fig. 3), and a movable contact 115 is rotated during an exposure at a constant speed by a small synchronous motor 116 (Fig. 5) which is energized directly from the source of supply L1—L2.

As shown more in detail in Fig. 5, this motor 116 drives a gear train 117 which is connected to one plate of a friction clutch or the like 118, while the other plate of this clutch is connected to the rotatable arm 115 so that upon engagement of the plates of clutch 118 the motor 116 rotates the contact arm 115 which then slides upon the edge of the cylindrical-shaped resistance element 112. Before an exposure the plates of clutch 118 are disengaged and the rotatable contact arm 115 is in the position shown in Fig. 4 adjacent the terminal 106 to which conductor 114 is connected (having returned to such position from the previous exposure under the influence of a coil spring not shown) so that the resistance and voltage between such terminal 106 and the contact arm 115 is zero. When a clutch relay 119 (Fig. 5) is energized at the beginning of an exposure, as hereinafter described, it attracts a pivoted lever arm 120, against the potential energy of a return spring 122, thus causing sliding movement of the plate of clutch 118 carrying the shaft 123 to which contact arm 115 is secured, to the right, as viewed in Fig. 5, with attendant engagement of the clutch 118, which accordingly causes the motor 116 to begin to rotate contact arm 115 clockwise as shown by the arrow in Fig. 4. Thus during the exposure, the contact arm 115 moves steadily away from its initial position of zero resistance and voltage relative to the terminal 106 to which the conductor 114 is connected, causing a steady increase of resistance and voltage between the two. After a certain length of time, represented by the rotation of contact arm 115 at a constant speed as previously mentioned, this voltage across arm 115 and contact of conductor 114 will become equal to the output voltage "e" of the analogue computer during that particular exposure for which the latter was adjusted. When the output voltage of this linear voltage generator 107 accordingly becomes equal to the output voltage of the analogue computer, a sensing element "senses" such voltage balance and itself becomes instantly operative.

This previously mentioned sensing element 108 may be a relay or the like but we have found it more desirable to employ an electronic tube, such as a thyratron 125. As shown in Fig. 4, the indirectly heated cathode 126 of such tube is connected to one side of the supply source L2 and its heating element is supplied with low voltage heating energy from the secondary winding 27 (Fig. 3) by means of conductors 127 and 128. The anode or plate 129 of this tube is then connected by a conductor 130 to one side of the winding of the aforementioned relay 109 while the remaining end of such relay winding is connected to the other side of the supply source L1. It should thus be apparent that upon the thyratron tube 125 becoming conductive to pass current that relay 109 is immediately energized with attendant closure of its normally open contact switch 132 and opening of its normally closed contact switch 133.

From Fig. 4 it will be noted that the biasing potential for the grid 134 of the tube 125 is uniquely produced by a very simple arrangement which includes the same low potential source 27 for the cathode heater. A capacitor 135 together with a series connected rectifier 136 are connected across the conductors 127 and 128, and thus in parallel with the cathode heater, and a small potentiometer 137, having its movable contact 138 connected to the grid 134, is shunted across the capacitor 135 with the contact 138 being so adjusted that the grid biasing voltage from the potentiometer 137 alone will be of the order of about −2 volts so as to keep the thyratron tube 125 just about on the borderline between conductivity and non-conductivity. It will also be noted that the output voltage of the analogue computer "e" is impressed across the linear voltage generator 107 and the potentiometer 137, since the conductor 90 is connected to the same terminal 106 of the generator 107 as that to which the conductor 114 is connected, and conductor 104 is connected to one end of potentiometer 137, while the rotatable contact arm 115 is connected to the conductor 128 and hence to the cathode 126 to thus complete the grid circuit of thyratron tube 125. Accordingly, a portion of the voltage from the potentiometer 137 is connected in series with the output voltage "e" of the analogue computer and such combined voltage impressed on the grid 134.

In the arrangement as shown it is essential that during the same half wave of the alternating current cycle certain points be at definite polarity with respect to each other. For example, during the same half-wave the end of potentiometer 137, to which the conductor 104 is connected, must be negative with respect to terminal 106 of the linear voltage generator, and the point or terminal of linear voltage generator 107 to which the conductor 113 is connected, must be negative with respect to the terminal 106 and the anode 129 of thyratron tube 125 must of course be positive with respect to its cathode 126.

At the beginning of an exposure the grid 134 is highly negative with respect to the cathode 126, since the full output voltage "e" of the analogue computer is added to the small grid bias voltage as set by the adjustment of the contact 138 of potentiometer 137, and the opposing voltage between terminal 106 and rotatable contact arm 115 is still zero. During the exposure, as hereinbefore mentioned, contact arm 115 rotates at a constant speed in the direction of the arrow in Fig. 4, thus increasing the opposing voltage in accordance with the increasing distance between the arm 115 and the terminal 106, until after a certain time has elapsed the opposing voltage between these latter elements equals the output voltage "e" of the analogue computer which thus eliminates the effect of such voltage "e" upon the grid 134 and leaving only the small biasing voltage from the potentiometer 137 maintaining the grid slightly negative with respect to the cathode 126.

A negligibly short time later the continued rotation of arm 115 causes the opposing voltage from the linear voltage generator 107 to exceed the output voltage "e" from the analogue computer by a small amount which is subtracted from the bias of the potentiometer 137 thus effectively removing the grid bias and causing the thyratron tube 125 to immediately become conductive with attendant energization of relay 109 to terminate the exposure either by actuation of a shutter but preferably by switching off the enlarger lamp 9, as hereinafter described. From the foregoing it will be apparent that the time which elapses, before the opposing voltage is built up and the thyratron becomes conductive to energize the relay to terminate the exposure, is proportional to the distance that contact arm 115 has to travel, and that such distance in turn is proportional to the opposing voltage that must be built up between the arm 115 and the terminal 106, to equal the output voltage "e" of the analogue computer 29. The "voltage-time converter" 105 therefore not only performs its intended function of converting voltages into exposure times but a further advantageous feature in the combination of the analogue computer and the voltage-time converter is its independence from line voltage fluctuations. Since both the output voltage "e" of the analogue computer and the opposing voltage of the linear voltage generator are influenced by line voltage fluctuations in exactly the same manner, the instant when both are equal is completely unaffected by such fluctuations.

The next essential part of the electrical control device of the present invention is that of the "automatic sequencing unit" 140, shown more in detail in the lower portion of Fig. 4, and whose function, as the name implies, is to cause all operations necessary for a triple exposure of a sheet of color print material (usually color paper) to be performed automatically and in the proper sequence. Its function is based on the coaction of the motor driven filter unit assembly and a series of relays, including the relays 46, 52, 57 and 109 together with their respective contact switches, as hereinbefore mentioned. As shown in Fig. 4, the circular disc 15 of the filter unit assembly, in addition to having the four apertures therein with their respective filters, is contacted by a brush 142 which is connected to one side of the power supply L2 as is one side of its driving motor 16. Such disc 15 is also shown provided with a fixed contact 143 at its periphery and which contact, during rotary indexing of the disc, engages one of a plurality of normally open contacts 144, 145, 146 and 147 connected to one end of the winding of previously mentioned relays 46, 52 and 57, as well as a further relay 148. Since the remaining end of the winding of each of these four relays is connected to the other side of the power supply L1, it will be obvious that when the disc contact 143 engages the normally open contact 144, as shown in Fig. 4 for example, its associated relay 148 is immediately energized, and the same result would follow respecting each remaining relay 46, 52 and 57 upon the engagement of the peripheral contact 143 with normally open contacts 145, 146 and 147, respectively, as the disc 15 is indexed by rotation of the motor 16 to which it is connected.

Each relay 148, 46, 52 and 57, as shown in Fig. 4, is provided with a normally closed contact switch 149, 150, 152 and 153, respectively, which are in series with each other and are utilized to connect the other side of the motor 16 to the other side of the supply source L1, so long as none of these four relays are energized. Consequently the filter disc 15 is rotated by the motor 16 until the peripheral contact 143 engages one of the normally open contacts 144, 145, 146 or 147 at a time to cause energization of its associated relay, which then opens its associated normally closed contact switch to automatically stop rotation of the disc 15 by interrupting the energizing circuit to the motor 16. Such an example is shown in Fig. 4 wherein the engagement of the peripheral contact 143 with the normally open contact 144 has energized relay 148 causing it to open its normally closed contact switch 149, thus stopping the disc 15 in the position as shown.

Although relay 148 operates only contact switch 149 it will be noted that "red" relay 46 upon energization not only opens normally closed contact switch 150 and closes contact switches 45, 78 and 103, as previously mentioned, but also closes a still further pair of contact switches 155 and 156. Likewise "GR" relay 52 and "BL" relay 57, in addition to their normally open contacts 50, 83, 102 and 56, 87, 100, respectively, as previously mentioned, are each provided with a still further pair of normally open contact switches 157, 158, and 159, 160, respectively. As shown in Fig. 4, the relay contact switches 155, 157 and 159 are in parallel and operable upon energization of their associated relay, to close a circuit extending from one side of the line L2 through the closed contact switch and a conductor 162 to the clutch relay 119 of the "voltage-time converter" 105, and from such relay to the other side of the supply source L1, so that upon energization of any one of the "red," "green" or "blue" relays, the clutch relay 119 is simultaneously energized by closure of one of these contact switches 155, 157 or 159. Similarly the contact switches 156, 158 and 160 are in parallel and are operable, upon energization of their associated "red," "green" or "blue" relay, to close a circuit to the lamp 9, which extends from one side of the supply source L2, through the closed switch and a conductor 163 to the lamp 9, and from the latter through normally closed contact switch 133 of relay 109 to the other side of the supply source L1, so that enlarger lamp 9 remains lighted as long as any one of the relays 46, 52 or 57 remains energized and until relay 109 is energized by operation of the thyratron 125 to cause opening of relay contact switch 133. In order to start the exposure a normally open pushbutton 165 is provided which is connected in parallel with the normally open contact switch 132 of relay 109 and for the purpose of lighting the enlarger lamp 9 for focusing purposes, a normally open push-button 166, in parallel with the relay contact switches 156, 158, 160, may be depressed by the operator.

The electrical control device of the present invention as hereinbefore described operates in the following manner. After having made a test-print with a given transparency positioned in the film stage 12 with a given color printing material and a desired magnification, the operator is then in a position to adjust the various controls. The step-switches 28 and 67 being once set need rarely be further disturbed so the operator merely adjusts the sine resolvers 29 and 65 for the appropriate color balance of paper and color unbalance of film, as previously mentioned, as well as setting the control knob 63 to compensate for different color temperature of the light source and adjusting the step-switches 94, 95 and 96 so as to compensate for the unequal sensitivity of the layers of the color printing material 14 as determined from the making of such test-print. All adjustments as indicated having been made, final printing of the exposure is then ready to be made.

Before the exposure is made the system will be in the position shown in the several figures, with peripheral contact 143 in engagement with normally open contact 144, so that upon closure of the main switch 4 in the power supply, relay 148 is energized thereby opening normally closed contact switch 149 causing the motor 16 of the filter unit assembly to remain unenergized. The "clear" aperture of the filter disc 15 which carries no filter is at this time in front of the lens 13. The operator may then depress the push-button 166 to light the enlarger lamp 9, if desired, in order to adjust the projector carriage 8 for proper focusing and general observation of the projected image, after which the device is ready for the starting of the exposure. To do this the operator then depresses push-button 165, which by virtue of a conductor 168 by-passes the contact switches 149, 150, 152 and 153, and causes energization of motor 16 which begins to rotate filter disc 15 and moves peripheral contact 143 out of engagement with normally open contact 144. As soon as separation of these contacts occurs relay 148 becomes deenergized thereby causing its contact switch 149 to return to its normally closed position in series with the other normally closed contact switches 150, 152 and 153 which also completes a circuit to the motor 16 allowing the operator to then release the depressed push-button 165.

After one-quarter revolution of the filter disc 15 peripheral contact 143 will then engage normally open contact 145 causing "red" relay 46 to then become energized with opening of its normally closed contact switch 150 to deenergize motor 16 and stop the filter disc 15 with its "red" filter in position in front of the lens 13. Simultaneously normally open contact switches 155, 156, 45, 78 and 103 are closed. Closure of the contact switch 155 causes energization of clutch relay 119 which in turn causes engagement of clutch 118 with commencement of rotation of contact arm 115 by the motor 116 and gear train 117. At the same time closure of "red" relay contact switch 156 causes illumination of the enlarger lamp 9 and the simultaneous closure of the remaining three contact switches 45, 78 and 103 automatically selects the proper connection within the analogue computer for the "red" exposure, as hereinbefore explained.

Following the elapse of a certain time, depending upon the output voltage "$e$" of the analogue computer 30, the rotating contact arm 115 will have moved far enough to render the opposing voltage of the voltage-time converter equal to the output voltage "$e$" of the analogue computer, as previously explained, which finally makes the thyratron tube 125 conductive with energization of relay 109. The energization of this relay 109 then causes four things to occur, (a) the normally closed relay contact switch 133 opens extinguishing enlarger lamp 9 and terminating the exposure, (b) normally open relay contact switch 132 closes energizing motor 16 and causing filter disc 15 to again start to rotate, and (c) as soon as peripheral contact 143 leaves contact 145 "red" relay 46 is deenergized with return of its contact switch 155 to its normally open position, with attendant deenergization of clutch relay 119 causing the clutch 118 to disengage contact arm 115 from its driving motor 116 and gear train 117, allowing the rotary contact arm 115 to return to its initial starting position under the influence of its resetting spring. Also, (d) deenergization of "red" relay 46 with return of its contact switch 150 to its normally closed position causes motor 16 to remain energized even after relay 109 is deenergized with opening of its contact switch 132.

Following another one-quarter revolution of the filter disc 15 its peripheral contact 143 engages the contact 146 which causes energization of "green" relay 52 with opening of its contact switch 152 to stop rotation of filter disc 15 with the "green" filter now in position in front of the lens 13 and since the normally open contact switches 157, 158, 50, 83 and 102 are simultaneously closed the entire cycle as just described is repeated while the "green" filter remains in front of the lens 13. Upon completion of the exposure in the identical manner as above described, the filter disc 15 is again rotated one-quarter of a turn which next positions the "blue" filter in front of the lens followed by another repetition of the same operations as detailed above relative to the "red" and followed by the "green." However, following the repetition of the operating cycle for the "blue" position, the system automatically returns to its initial position with the "clear" aperture in front of the lens 13 since relay 148 has no contact switches to cause energization of the clutch relay 119 nor to cause lighting of the enlarger lamp 9. Accordingly, to again start another complete printing exposure the operator must again depress the starting push-button 165 as previously mentioned.

From the foregoing description of the present invention it becomes obvious that the entire electrical control device is operable from an alternating current power supply, and hence all the components of the device are responsive to A.C. making them of relatively inexpensive and simple construction, but such use of A.C. nevertheless introduces certain limitations. In the first place, the exposure time as measured in effect by the motor driven potentiometer of the linear voltage generator becomes uncertain by almost a full cycle (i.e. usually 1/60 sec.), because, if the thyratron does not become conductive at least at the peak of a half-wave during which its anode is positive with respect to its cathode, then a full cycle or 1/60 sec. must elapse before the thyratron again has an opportunity to become conductive, and in the meantime the grid bias may have become somewhat less negative than strictly necessary. Secondly, there is a certain small range between the state in which a thyratron is definitely conducting or nonconducting thereby making its state uncertain and not positively predictable. By the use of D.C. this region of uncertainity is made considerably smaller for both the plate and grid circuits of the thyratron than is possible with A.C., because the grid biasing voltage potentiometer 137 becomes more critical with D.C. and the grid biasing voltage can hence be made much sharper.

It is accordingly readily possible to convert the electrical control device of the present invention to one of D.C. operation by simply providing either a half-wave or full-wave rectifying system for the output of the transformer secondary windings 23, 24, 25 and 26 so that D.C. would then be supplied to the analogue computer and the time-voltage converter eliminating the above mentioned limitations. However, the use of rectified systems is expensive and hence economically justified only when unusually short exposure times and/or unusually high precision is required.

In view of the above it should thus become obvious to those skilled in the art that an electrical control device for color photography has been herein shown and described in which an analogue computer is provided for generating three voltages proportional to three exposure times each corresponding to one of the primary colors, with such voltages being then supplied to a voltage-time converter for converting the three voltages into separate exposure times for each color, and which voltage then operates an automatic sequencing unit for causing all required operations to automatically occur in a proper order.

Although one embodiment of the present invention has been specifically shown and described it is to be understood that still further modifications thereof may be made without departing from the invention.

We claim:

1. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply comprising voltage modifying means adjustable by an operator to modify the voltage from said power supply to produce a preselected output voltage from said computer which is proportional to three corrected exposure times for each of three primary colors, a voltage-time converter connected to said analogue computer and automatically operable at a predetermined rate and after the lapse of a period of time in response to the output voltage of said analogue computer to convert such output voltage into a total exposure time by causing a cessation in the operation of said device, and a sequencing unit connected to said analogue computer and said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

2. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to correct for color balance of both the printing paper and the film being printed comprising voltage modifying means adjustable to modify the voltage from said power supply to produce a preselected output voltage from said computer which is proportional to three corrected exposure times corresponding in magnitude and direction to each of the three primary colors, a voltage-time converter connected to said analogue computer and automatically operable at a predetermined rate and after the lapse of a period of time in response to the output voltage of said analogue computor to convert such output voltage into a total exposure time by causing a cessation in the operation of said device, and a sequencing unit connected to said analogue computer and said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

3. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising adjustable means operable to modify the voltage of said power supply into a preselected voltage corresponding to the magnitude of the color correction, and sine resolver means connected to said adjustable means and presettable by an operator to still further modify the voltage as selected by said adjustable means to produce a voltage corresponding to the direction of color correction whereby said analogue computer thus corrects for color balance of both the printing paper and the film being printed; a voltage-time converter connected to said analogue computer and automatically operable at a predetermined rate and after the lapse of a period of time in response to the output voltage of said analogue computer to convert such output voltage into a total exposure time by causing a cessation in the operation of said device, and a sequencing unit connected to said analogue computer and said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

4. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising a first adjustable means operable to modify the voltage of said power supply into a preselected voltage corresponding to the magnitude of the color correction, sine resolver means connected to said first adjustable means and presettable by an operator to still further modify the voltage as selected by said first adjustable means to produce a voltage corresponding to the direction of color correction whereby the setting of both said first adjustable means and said sine resolver means thus corrects for color balance of both the printing paper and the film being printed, and a second adjustable means connected to said sine resolver means and operable to modify the output voltage of the latter to compensate for different color temperatures of said light source by increasing the voltage produced by said sine resolver means corresponding to one of said primary colors while simultaneously decreasing the voltage produced by said sine resolver means corresponding to another of said primary colors; a voltage-time converter connected to said analogue computer and automatically operable at a predetermined rate and after the lapse of a period of time in response to the output voltage of said analogue computer to convert such output voltage into a total exposure time by causing a cessation in the operation of said device, and a sequencing unit connected to said analogue computer and said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

5. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising a first adjustable means operable to modify the voltage of said power supply into a preselected voltage corresponding to the magnitude of the color correction, sine resolver means connected to said first adjustable means and presettable by an operator to still further modify the voltage as selected by said first adjustable means to produce a voltage corresponding to the direction of color correction whereby the setting of both said first adjustable means and said sine resolver means thus corrects for color balance of both the printing paper and the film being printed, a second adjustable means connected to said sine resolver means and operable to modify the output voltage of the latter to compensate for different color temperatures of said light source by increasing the voltage produced by said sine resolver means corresponding to one of said primary colors while simultaneously decreasing the voltage produced by said sine resolver means corresponding to another of said primary colors, and voltage modifying means connected to said second adjustable means and operable to still further modify the voltage representing the corrected exposure times for two of said primary colors while maintaining the voltage from said second adjustable means and corresponding to the corrected exposure time for the remaining primary color unaltered to thus compensate for nonuniform failure of the reciprocity law; a voltage-time converter connected to said analogue computer and automatically operable at a predetermined rate and after the lapse of a period of time in response to the output voltage of said analogue computer to convert such output voltage into a total exposure time by causing a cessation in the operation of said device, and a sequencing unit connected to said analogue computer and said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

6. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising a first adjustable means operable to modify the voltage of said power supply into a preselected voltage corresponding to the magnitude of the color correction, sine resolver means connected to said first adjustable means and presettable by an operator to still further modify the voltage as selected by said first adjustable means to produce a voltage corresponding to the direction of color correction whereby the setting of both said first adjustable means and said sine resolver means thus corrects for color balance of both the printing paper and the film being printed, a second adjustable means connected to said sine resolver means and operable to modify the output voltage of the latter to compensate for different color temperatures of said light source by increasing the voltage produced by said sine resolver means corresponding to one of said primary colors while simultaneously decreasing the voltage produced by said sine resolver means corresponding to another of said primary colors, voltage modifying means connected to said second adjustable means and operable to still further modify the voltage representing the corrected exposure time for two of said primary colors while maintaining the voltage from said second adjustable means and corresponding to the corrected exposure time for the remaining primary color unaltered to thus compensate for nonuniform failure of the reciprocity law, and a potentiometer connected to said voltage modifying means having a resistance per unit length increasing linearly with distance to provide uniformly spaced settings and operable to modify the voltage from said voltage modifying means and thus still further modify the output voltage from said analogue computer to compensate for different magnification ratios; a voltage-time converter connected to said analogue computer and automatically operable at a predetermined rate and after the lapse of a period of time in response to the output voltage of said analogue computer to convert such output voltage into a total exposure time by causing a cessation in the operation of said device, and a sequencing unit connected to said analogue computer and said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

7. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising a first adjustable means operable to modify the voltage of said power supply into a preselected voltage corresponding to the magnitude of the color correction, sine resolver means connected to said first adjustable means and presettable by an operator to still further modify the voltage as selected by said first adjustable means to produce a voltage corresponding to the direction of color correction whereby the setting of both said first adjustable means and said sine resolver means thus corrects the color balance of both the printing paper and the film being printed, a second adjustable means connected to said sine resolver means and operable to modify the output voltage of the latter to compensate for different color temperatures of said light source by increasing the voltage produced by said sine resolver means corresponding to one of said primary colors while simultaneously decreasing the voltage produced by said sine resolver means corresponding to another of said primary colors, voltage modifying means connected to said second adjustable means and operable to still further modify the voltage representing the corrected exposure time for two of said primary colors while maintaining the voltage from said second adjustable means and corresponding to the corrected exposure time for the remaining primary color unaltered to thus compensate for nonuniform failure of the reciprocity law, a potentiometer connected to said voltage modifying means having a resistance per unit length increasing linearly with distance to provide uniformly spaced settings and operable to alter the voltage from said voltage modifying means to compensate for different magnification ratios, and compensating means connected to said potentiometer and operable to vary the voltage as produced by said potentiometer to correct for any unequal sensitivity of layers of color printing paper; a voltage-time converter connected to said analogue computer and automatically operable at a predetermined rate and after the lapse of a period of time in response to the output voltage of said analogue computer to convert such output voltage into a total exposure time by causing a cessation in the operation of said device, and a sequencing unit connected to said analogue computer and said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

8. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising a first adjustable means operable to modify the voltage of said power supply into a preselected voltage corresponding to the magnitude of the color correction, sine resolver means connected to said first adjustable means and presettable by an operator to still further modify the voltage as selected by said first adjustable means to produce a voltage corresponding to the direction of color correction whereby the setting of both said first adjustable means and said sine resolver means thus corrects for color balance of both the printing paper and the film being printed, a second adjustable means connected to said sine resolver means and operable to modify the output voltage of the latter to compensate for different color temperatures of said light source by increasing the voltage produced by said sine resolver means corresponding to one of said primary colors while simultaneously decreasing the voltage produced by said sine resolver means corresponding to another of said primary colors, voltage modifying means connected to said second adjustable means and operable to still further modify the voltage representing the corrected exposure time for two of said primary colors while maintaining the voltage from said second adjustable means and corresponding to the corrected exposure time for the remaining primary color unaltered to thus compensate for nonuniform failure of the reciprocity law, a potentiometer connected to said voltage modifying means having a resistance per unit length increasing linearly with distance to provide uniformly spaced settings and operable to alter the voltage from said voltage modifying means to compensate for different magnification ratios, and compensating means connected to said potentiometer and operable to vary the voltage as produced by said potentiometer to correct for any unequal sensitivity of layers of color printing paper; a voltage-time converter connected to the final output voltage of said analogue computer and operable to convert such output voltage into a total exposure time comprising a linear-voltage generator including an automatically operable potentiometer for producing within a predetermined period of time a voltage at least equal to the output voltage of said analogue computer and to cause a cessation in the operation of said device when said voltages balance each other, and a sequencing unit connected to said analogue computer and to said voltage-time converter comprising a plurality of electrical means operable by said voltage-time converter when the voltage produced thereby equals the output voltage of said analogue computer to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

9. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising a first adjustable means operable to modify the voltage of said power supply into a preselected voltage corresponding to the magnitude of color correction, sine resolver means connected to said first adjustable means and presettable by an operator to still further modify the voltage as selected by said first adjustable means to produce a voltage corresponding to the direction of color correction whereby the setting of both said first adjustable means and said sine resolver means thus corrects for color balance of both the printing paper and the film being printed, a second adjustable means connected to said sine resolver means and operable to modify the output voltage of the latter to compensate for different color temperatures of said light source by increasing the voltage produced by said sine resolver means corresponding to one of said primary colors while simultaneously decreasing the voltage produced by said sine resolver means corresponding to another of said primary colors, voltage modifying means connected to said second adjustable means and operable to still further modify the voltage representing the corrected exposure time for two of said primary colors while maintaining the voltage from said second adjustable means and corresponding to the corrected exposure time for the remaining primary colors unaltered to thus compensate for nonuniform failure of the reciprocity law, a potentiometer connected to said voltage modifying means having a resistance per unit length increasing linearly with distance to provide uniformly spaced settings and operable to alter the voltage from said voltage modifying means to compensate for different magnification ratios, and compensating means connected to said potentiometer and operable to vary the voltage as produced by said potentiometer to correct for any unequal sensitivity of layers of color printing paper; a voltage-time converter connected to the final output voltage of said analogue computer and operable to convert such output voltage into a total exposure time comprising a linear-voltage generator including an automatically operable potentiometer for producing within a predetermined period of time a voltage substantially equal to the output voltage of said analogue computer and to cause a cessation in the operation of said device when said voltages balance each other, and a sensing means including an electronic tube and connected to said linear-voltage generator and operable when the voltage generated thereby substantially equals the output voltage of said analogue computer to close a circuit; and a sequencing unit connected to said analogue computer and to said circuit and comprising a plurality of electrical means operable by closure of said circuit when the voltage produced by said voltage-time converter substantially equals the output voltage of said analogue computer to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

10. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply comprising voltage modifying means adjustable by an operator to modify the voltage from said power supply to produce a preselected output voltage from said computer which is proportional to three corrected exposure times for each of three primary colors, a voltage-time converter connected to said analogue computer and operable to convert such output voltage into a total exposure time comprising a linear-voltage generator including an automatically operable potentiometer for producing within a predetermined period of time a voltage substantially equal to the output voltage of said analogue computer and to cause a cessation in the operation of said device when said voltages balance each other, and a sequencing unit connected to said analogue computer and to said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

11. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply comprising voltage modifying means adjustable by an operator to modify the voltage from said power supply to produce a preselected output voltage from said computer which is proportional to three corrected exposure times for each of three primary colors, a voltage-time converter connected to said analogue computer and operable to convert such output voltage into a total exposure time comprising a linear-voltage generator including an automatically operable potentiometer for producing within a predetermined period of time a voltage substantially equal to the output voltage of said analogue computer and to cause a cessation in the operation of said device when said voltages balance each other, a sensing means including an electronic tube connected to said linear-voltage generator and operable when the voltage generated thereby substantially equals the output voltage of said analogue computer to close a circuit, and a sequencing unit connected to said analogue computer and to said circuit and comprising a plurality of electrical means operable by closure of said circuit when the voltage produced by said voltage-time converter substantially equals the output voltage of said analogue computer to cause operation of said drive member with attendant movement of a filter of each of the three primary colors consecutively into the path of the light beam from said source for a period of time as determined by the operation of said voltage-time converter and said sequencing unit being also operable to cause cessation in the operation of said linear-voltage generator together with extinguishment of said light source.

12. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply comprising voltage modifying means adjustable by an operator to modify the voltage from said power supply to produce a preselected output voltage from said computer which is proportional to three corrected exposure times for each of three primary colors, a voltage-time converter connected to said analogue computer and operable to convert such output voltage into a total exposure time comprising a linear-voltage generator including an automatically operable potentiometer for producing within a predetermined period of time a voltage substantially equal to the output voltage of said analogue computer and to cause a cessation in the operation of said device when said voltages balance each other, a sensing means including an electronic tube connected to said linear-voltage generator and operable when the voltage generated thereby substantially equals the output voltage of said analogue computer to cause said electronic tube to become conductive, and a relay operable upon said electronic tube becoming conductive to cause operation of said drive member with attendant movement of a filter of each of the three primary colors consecutively into the path of the light beam from said source for a period of time as determined by the operation of said voltage-time converter and said relay being also operable to cause cessation in the operation of said linear-voltage generator together with extinguishment of said light source.

13. An electrical control device for photographic color printers and enlargers having a source for producing a beam of light comprising a filter assembly provided with three filters of different primary colors, a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising adjustable means connected to said power supply and operable to modify the predetermined voltage thereof to produce a preselected output voltage corresponding to the magnitude of the color correction, sine resolver means connected to said adjustable means and presettable by an operator to modify the output voltage from the latter to one corresponding to the direction of color correction whereby the voltage setting of said adjustable means and said sine resolver means corrects for color balance of both the printing paper and the film being printed, and a potentiometer connected to said sine resolver means and adjustable by an operator to modify the voltage produced by said analogue computer to compensate for different magnification ratios; and electrically operable means connected to said analogue computer and operable in response to the preselected output voltage from the latter, to cause operation of said drive member with attendant consecutive movement of one of said different color filters at a time into the light beam from said source in a predetermined timed sequence.

14. An electrical control device for photographic color printers and enlargers having a source for producing a beam of light comprising a filter assembly provided with three filters of different primary colors, a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising adjustable means connected to said power supply and operable to modify the predetermined voltage thereof to produce a preselected output voltage corresponding to the magnitude of the color correction, sine resolver means connected to said adjustable means and presettable by an operator to modify the output voltage from the latter to one corresponding to the direction of color correction whereby the voltage setting of said adjustable means and said sine resolver means corrects for color balance of both the printing paper and the film being printed, and a potentiometer connected to said sine resolver means having a resistance per unit length increasing linearly with distance to provide uniformly spaced settings and adjustable by an operator to modify the voltage produced by said analogue computer to compensate for different magnification ratios; and electrically operable means connected to said analogue computer and operable in response to the preselected output voltage from the latter, to cause operation of said drive member with attendant consecutive movement of one of said different color filters at a time into the light beam from said source in a predetermined timed sequence.

15. An electrical control device for photographic color printers and enlargers having a source for producing a beam of light comprising a filter assembly provided with three filters of different primary colors, a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of the three primary colors comprising a first adjustable means connected to said power supply and operable to modify the predetermined voltage thereof to produce a preselected output voltage corresponding to the magnitude of the color correction, sine resolver means connected to said first adjustable means and presettable by an operator to modify the output voltage from the latter to one corresponding to the direction of color correction whereby the voltage setting of said first adjustable means and said sine resolver means corrects for color balance of both the printing paper and the film being printed, a second adjustable means connected to said sine resolver means and operable to modify the output voltage of the latter to compensate for different color temperatures of said light source by increasing the voltage produced by said sine resolver means corresponding to one of said primary colors while simultaneously decreasing the voltage produced by said sine resolver means corresponding to another of said primary colors, voltage modifying means connected to said second adjustable means and operable to still further modify the voltage representing the corrected exposure time for two of said primary colors while maintaining the voltage from said second adjustable means and corresponding to the corrected exposure time for the remaining primary color unaltered to thus compensate for nonuniform failure of the reciprocity law, a potentiometer connected to said second adjustable means and to said voltage modifying means having a resistance per unit length increasing linearly with distance to provide uniformly spaced settings and adjustable by an operator to modify the voltage produced by said analogue computer to compensate for different magnification ratios, and compensating means connected to said potentiometer and operable to still further vary the voltage as produced by said potentiometer to correct for any unequal sensitivity of layers of color printing paper and whereby the actual output voltage of said analogue computer compensates for all variables and is proportional to three corrected exposure times for each of the three primary colors; and electrically operable means connected to said analogue computer and operable in response to the preselected output voltage from the latter, to cause operation of said drive member with attendant consecutive movement of one of said different color filters at a time into the light beam from said source in a predetermined timed sequence.

16. An electrical control device for phootgraphic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of three primary colors comprising voltage modifying means adjustable by an operator to preselect the output voltage therefrom including an element producing a voltage proportional to the exposure time for one of said primary colors and a higher voltage proportional to the exposure time for the other of said primary colors with the relative value of the difference between such voltages varying as a function of the total exposure time to compensate for non-uniform failure of the reciprocity law; a voltage-time converter connected to said analogue computer and automatically operable at a predetermined rate and after the lapse of a period of time in response to the output voltage of said analogue computer to convert such output voltage into a total exposure time by causing a cessation in the operation of said device, and a sequencing unit connected to said analogue computer and to said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

17. An electrical control device for photographic color printers and enlargers having a source for producing a beam of light comprising a filter assembly provided with three filters of different primary colors and a drive member operable to consecutively move one of said different color filters at a time into the light beam from said source, a power supply for producing electrical energy at a predetermined voltage, an analogue computer connected to said power supply and operable to modify said predetermined voltage and produce an output voltage proportional to three corrected exposure times for each of three primary colors comprising a potentiometer presettable by an operator to modify the voltage produced by said analogue computer to compensate for different magnification ratios, voltage modifying means forming a part of said potentiometer and operable to still further modify the voltage produced by said analogue computer comprising a fixed resistance portion of said potentiometer operable to produce a voltage proportional to the exposure time for one of said primary colors and a higher voltage proportional to the exposure time for the other of said primary colors with the relative value of the difference between such voltages varying as a function of the total exposure time to compensate for non-uniform failure of the reciprocity law; a voltage-time converter connected to said analogue computer and automatically operable at a predetermined rate and after the lapse of a period of time in response to the output voltage of said analogue computer to convert such output voltage into a total exposure time by causing a cessation in the operation of said device, and a sequencing unit connected to said analogue computer and to said voltage-time converter comprising a plurality of electrical means operable by said voltage-time converter after the lapse of a predetermined period of time to cause operation of said drive member with attendant movement of a filter of each of the three primary colors consecutively into the path of the light beam from said source for a period of time as determined by the operation of said voltage-time converter and said sequencing unit being also operable to cause extinguishment of said light source and cessation in the operation of said device.

18. An electrical control device for photographic color printers and enlargers having a source for producing a beam of light comprising a filter assembly provided with three filters of different primary colors, a drive member operable to consecutively move one of said different color filters at a time into the light beam from said source, a power supply for producing electrical energy at a predetermined voltage, an analogue computer connected to said power supply and operable to produce an output voltage proportional to three corrected exposure times for each of three primary colors comprising voltage modifying means adjustable to produce a preselected voltage proportional to the exposure time for one of said primary colors and a higher voltage proportional to the exposure time for the other of said primary colors with the relative value of the difference between such voltages varying as a function of the total exposure time to compensate for non-uniform failure of the reciprocity law, and electrically operable means connected to said analogue computer and operable in response to the preselected output voltage from the latter to cause operation of said drive member with attendant consecutive movement of each of said color filters into the light beam from said source for a period of time as determined by the preselected voltage setting of said voltage modifying means followed by extinguishment of said light source and cessation in the operation of said device.

References Cited in the file of this patent

UNITED STATES PATENTS

| | | |
|---|---|---|
| 2,518,947 | Simmon | Aug. 15, 1950 |
| 2,573,113 | Simmon | Oct. 30, 1951 |
| 2,665,065 | Davidson | Jan. 5, 1954 |
| 2,740,828 | Haynes | Apr. 3, 1956 |
| 2,764,060 | Horak | Sept. 25, 1956 |

FOREIGN PATENTS

| | | |
|---|---|---|
| 687,405 | Germany | Jan. 29, 1940 |

OTHER REFERENCES

"Analog Computer Techniques," by C. L. Johnson, McGraw-Hill Book Company, 1956, see pages 144, 145, 151, 201, and 252–255.